United States Patent
Brengartner et al.

(10) Patent No.: US 12,281,929 B2
(45) Date of Patent: Apr. 22, 2025

(54) VIBRONIC SENSOR

(71) Applicant: Endress+Hauser SE+Co. KG, Maulburg (DE)

(72) Inventors: Tobias Brengartner, Emmendingen (DE); Jan Schleiferböck, Rümmingen (DE); Benjamin Monse, Vogtsburg (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 296 days.

(21) Appl. No.: 18/002,345

(22) PCT Filed: Jun. 16, 2021

(86) PCT No.: PCT/EP2021/066258
§ 371 (c)(1),
(2) Date: Dec. 19, 2022

(87) PCT Pub. No.: WO2021/255102
PCT Pub. Date: Dec. 23, 2021

(65) Prior Publication Data
US 2023/0228614 A1    Jul. 20, 2023

(30) Foreign Application Priority Data

Jun. 19, 2020   (DE) ............... 10 2020 116 281.2

(51) Int. Cl.
*G01F 23/296* (2022.01)
*G01F 1/667* (2022.01)
(Continued)

(52) U.S. Cl.
CPC .......... *G01F 23/296* (2013.01); *G01F 1/667* (2013.01); *G01H 11/06* (2013.01); *G01N 11/16* (2013.01); *G01N 29/42* (2013.01)

(58) Field of Classification Search
CPC .............. G01F 23/296; G01F 23/2965; G01F 23/2966; G01F 23/2968; G01F 1/667;
(Continued)

(56) References Cited

U.S. PATENT DOCUMENTS

| 6,520,915 B1 * | 2/2003 | Lin ..................... G01S 7/52047 600/443 |
| 2007/0186678 A1 | 8/2007 | Griessbaum et al. |

(Continued)

FOREIGN PATENT DOCUMENTS

| DE | 102014119061 A1 | 6/2016 |
| DE | 102016111134 A1 | 12/2017 |
| WO | 2007047524 A2 | 4/2007 |

*Primary Examiner* — Paul M. West
(74) *Attorney, Agent, or Firm* — Mark A. Logan; Endress+Hauser (USA) Holding, Inc.

(57) ABSTRACT

A vibronic sensor used to determine a process variable of a medium in a container comprises a mechanically vibratable unit, a drive/receiving unit, and an electronic unit. The drive/receiving unit excites mechanical vibrations in the mechanically vibratable unit via an electric excitation signal and receives the mechanical vibrations of the mechanically vibratable unit and convert same into an electric reception signal. The electronic unit is designed to generate the excitation signal on the basis of the reception signal and determine the process variable from the reception signal. The electronic unit includes an adaptive filter and is designed to set the filter characteristic of the adapter filter to produce a target phase offset between the excitation and reception signals. The sensor also has a detection unit to determine a phase offset between the excitation signal and the reception signal and/or the amplitude of the reception signal using a quadrature demodulation.

7 Claims, 3 Drawing Sheets

(51) Int. Cl.
*G01H 11/06* (2006.01)
*G01N 11/16* (2006.01)
*G01N 29/42* (2006.01)

(58) Field of Classification Search
CPC ........... G01N 2011/0073; G01N 11/16; G01N 29/42; G01N 29/4436; G01H 11/06; G01H 11/08
See application file for complete search history.

(56) References Cited

U.S. PATENT DOCUMENTS

2011/0288795 A1   11/2011   Buccafusca
2017/0343459 A1*  11/2017   Brengartner ........... G01N 9/002

* cited by examiner

VIBRONIC SENSOR

CROSS-REFERENCE TO RELATED APPLICATIONS

The present application is related to and claims the priority benefit of DPMA Patent Application No. 10 2020 116 281.2, filed on Jun. 19, 2020, and International Patent Application No. PCT/EP2021/066258, filed on Jun. 16, 2021, the entire contents of which are incorporated herein by reference.

TECHNICAL FIELD

The invention relates to a vibronic sensor for determining and/or monitoring at least one process variable of a medium and to a method for operating the vibronic sensor.

BACKGROUND

Vibronic sensors are often used in process and/or automation engineering. In the case of fill level measuring devices, they have at least one mechanically vibratable unit such as, for example, a vibrating fork, a single rod, or a diaphragm. During operation, mechanical vibrations are excited in the latter by a drive/receiving unit, often in the form of an electromechanical transducer unit that can, in turn, be a piezoelectric drive or an electromagnetic drive, for example. In the case of flow meters, the mechanically vibratable unit can, however, also be designed as a vibratable tube, through which the respective medium flows, such as in a measuring device operating according to the Coriolis principle.

A wide variety of corresponding field devices are made by the applicant and, in the case of fill level measuring devices, are distributed under the name LIQUIPHANT or SOLIPHANT, for example. The underlying measurement principles are known in principle from numerous publications. The drive/receiving unit excites the mechanically vibratable unit to induce mechanical vibrations by means of an electrical excitation signal. Conversely, the drive/receiving unit can receive the mechanical vibrations of the mechanically vibratable unit and convert same into an electrical reception signal. The drive/receiving unit is accordingly either a separate drive unit and a separate receiving unit, or a combined drive/receiving unit.

Both the excitation signal and the reception signal are characterized by their frequency, amplitude and/or phase. Changes in these variables are, therefore, usually used accordingly for determination of the respective process variable, such as a predetermined fill level of a medium in a container or the density and/or viscosity of a medium, or the flow of a medium through a tube. In the case of a vibronic level switch for liquids, for example, a distinction is made between whether the vibratable unit is covered by the liquid or vibrates freely. The two states, the free state and the covered state, are thus differentiated—for example, based on different resonant frequencies, i.e., a frequency shift. The density and/or viscosity, in turn, can only be determined with such a measuring device if the vibratable unit is covered by the medium.

The drive/receiving unit is usually part of a feedback electrical oscillation circuit by means of which mechanical vibrations are excited in the mechanically vibratable unit. For the excitation, a specifiable value for the phase offset, i.e., a target value for the phase offset between the excitation signal and the reception signal, is often set via a control circuit. For example, an amplification factor of and oscillation circuit conditions according to which all phases occurring in the oscillation circuit result in a multiple of 360° must be met for a resonant vibration. A wide variety of methods for exciting a mechanically vibratable unit or for setting a specifiable phase offset are known from the prior art. A basic distinction can be made here between an analog and a digital excitation, wherein the difference is between the oscillation circuit, made up of analog components that must be adapted to the type of sensor used, and digital methods, which are, in principle, universally applicable.

According to a frequently used excitation principle, the control circuit comprises an amplifier and a phase shifter, by means of which the reception signal is fed back to the transmission signal, in order to set the specifiable value for the phase offset between the excitation signal and the reception signal. According to DE102006034105A1, for example, an adjustable phase shifter is used. The phase shifter is controlled via a control unit that measures the frequency of the previously amplified reception signal and at least based on stored data via the frequency-phase dependence of an amplifier unit.

An amplifier is also known from DE102007013557A1 that has an adjustable amplification factor, which is set by a control unit such that the amplitude of the transmission signal is substantially within a specifiable amplitude band.

A vibronic sensor is known from DE102005015547A1, wherein the electronic unit is provided with at least one all-pass filter for setting the target value for the phase offset. The all-pass filter changes the phase of an electrical signal at a constant gain as a function of the frequency. In particular, the all-pass filter can be controlled or regulated in such a manner that the phase between the excitation signal and the reception signal is adjustable. According to one embodiment of this invention, the reception signal is preferably only filtered and/or amplified before it is supplied to the all-pass filter, processed by it, and returned.

In the case of an analog excitation, however, the analog components, from which the oscillation circuit is built, must necessarily be adapted to the type of sensor used. Furthermore, the robustness of the sensor, in particular with regard to external vibrations, is dependent upon the selectivity of the filter used in each case for signal processing and/or evaluation, wherein the filters used determine the pitch of the phase response of the electronic unit. The greater the pitch of the phase response, the narrower the frequency range to be covered by the filter. Accordingly, there can be circumstances in which the sensor no longer vibrates in resonance.

From DE102009026685A1, an excitation method has become known, with which mechanical vibrations are excited in the mechanically vibratable unit by means of a so-called frequency sweep within a specifiable frequency band in the working range of the vibratable unit, successively with discrete excitation frequencies following one another, and the corresponding reception signals are received. Via the frequency sweep, that excitation frequency is determined at which the vibratable unit vibrates at a vibration frequency that corresponds to a specifiable value for the phase offset. This excitation frequency is applied in each case to the vibratable unit. An advantageous development of this method is the subject matter of DE102009028022A1, in which the evaluation of the reception signal is simplified by the reception signal being sampled and evaluated phase-selectively only at specific instants. Similarly, it is proposed in DE102010030982A1 that the reception signal be sampled at predetermined discrete instants in relation to the transmission signal, the sampled voltage values of the reception signal be each compared to the target value, which the reception signal at this instant assumes if the specifiable value for the phase offset is present, and, in the case of deviation of a voltage value from the target value, the frequency of the transmission signal be decreased or increased based on whether the deviation is positive or negative.

In the case of an excitation via a frequency sweep and the evaluation of the respective phases and/or amplitudes of the reception signal, it must however be noted that there is a dependency between the sweep speed of the frequency sweep and the frequency resolution.

An additional digital possibility for a vibronic sensor to regulate the phase offset between an excitation signal and a reception signal to a specifiable value is disclosed in DE00102010030982A1. The method described there is based on the functional principle of a phase-locked loop, PLL. The frequency of the excitation signal is set here such that there is a specifiable value for the phase offset between the excitation signal and the reception signal.

This type of excitation has decisive advantages with respect to evaluation speed, compared to excitation via a frequency sweep. To be sure, however, at least one phase detector is required, which influences robustness, i.e., in particular the stability of the control, among other things, if external vibrations occur, as well as the precision of the control circuit. In order for evaluation to be done in a stable manner, it must additionally be ensured that the amplitude of the excitation signal is kept at a constant value.

In order to reduce problems from the occurrence of external vibrations, such as vibrations from pumps or ultrasonic baths, during the operation of a vibronic sensor, DE102012101667A1 proposes configuring a control/evaluation unit in such a way as to control the vibration excitation in the presence of at least one external vibration as a function of the frequency and/or amplitude of the external vibrations, so that the reception signal is substantially not disturbed by the external vibration, and/or to suppress at least one frequency of an external vibration.

In order to be able to operate independently of disturbing influences, a vibronic sensor with an electronic unit comprising an adaptive filter has become known in the as yet unpublished German patent application with file reference DE102014119061A1. During ongoing operation of the vibronic sensor, the filter characteristic is set so that a target phase offset is produced between the excitation signal and the reception signal. DE102016111134A1 in turn proposes a vibronic sensor with an electronic unit having at least one adaptive filter. Two different operating modes are alternately executed, wherein mechanical vibrations are excited in the mechanically vibratable unit in a first mode, and wherein the vibrations are interrupted in a second operating mode and at least one value of a filter characteristic of the adaptive filter is set such that there is a specifiable phase offset between the excitation signal and the reception signal. Reference is made to both these applications in their entirety below.

SUMMARY

Proceeding from the aforementioned prior art, the present invention is based on the object of providing a vibronic sensor along with a method for operating the sensor, which is characterized by a high degree of measurement accuracy and a high degree of reliability.

This object is achieved by the vibronic sensor and by the method for operating a vibronic sensor according to the present disclosure.

With regard to the sensor, the object on which the invention is based is achieved by a vibronic sensor for determining and/or monitoring at least one process variable of a medium in a container, at least comprising a mechanically vibratable unit, a drive/receiving unit and an electronic unit, wherein the drive/receiving unit is designed to excite mechanical vibrations in the mechanically vibratable unit by means of an electrical excitation signal, and receive the mechanical vibrations of the mechanically vibratable unit and convert same into an electrical reception signal, wherein the electronic unit is designed to generate the excitation signal on the basis of the reception signal and determine the at least one process variable from the reception signal, and wherein the electronic unit comprises a first adaptive filter, and the electronic unit is designed to set the filter characteristic of the adaptive filter such that a target phase offset is produced between the excitation signal and the reception signal. According to the invention, the sensor also has a detection unit that is designed to determine a phase offset between the excitation signal and the reception signal and/or an amplitude of the reception signal using a quadrature demodulation.

The filter characteristic of a filter generally describes the behavior of the filter, i.e., its filter properties, and is determined by the so-called filter requirements, such as those for the passbands and stopbands. In some cases, the filter requirements also include specifications with regard to the group delay, maximum overshooting, edge steepness, center frequency, quality, etc. For example, one of the known filter characteristics, such as Bessel, Legendre, Butterworth, Chebyshev, Gauss or the like, can be used. Depending on the filter characteristic chosen, the transfer function, by which the amplitude response, phase response, and the frequency response are fully determined, is appropriately designed for the filter.

The filter characteristic of an adaptive filter can be set during operation. For example, the quality of the filter that correlates to the bandwidth as well as the location of the center frequency can be set. Accordingly, the phase offset $\phi_{Filter}$ between the input and output signals of the filter can be appropriately set by setting an appropriate filter characteristic. As a consequence of setting the phase offset between the input and output signals of the filter to a specifiable value, the frequency of the excitation signal is set such that a specifiable phase offset of $\phi_{soll}=360°-\phi_{Filter}$ is produced between the excitation signal and the reception signal. Since it is an adaptive filter, i.e., a filter that can be transferred, the quality of the filter can be increased without limiting the respective frequency range, as would be the case with a fixed filter. The setting of the specifiable phase offset via the filter is advantageously largely independent of disturbing influences that arise, such as external vibrations, so that the vibronic sensor according to the invention operates particularly robustly.

The adaptive filter makes the field device usable for a wide range of applications. For example, the field device can be operated at different phase setting accuracies and associated operating speeds. It is also easy to set different values for the specifiable phase offset, and this can advantageously be done at the software level. The same electronic unit and arrangement can thus be used for different specifiable phase offsets. The solution according to the invention can also advantageously be used in digital as well as analog versions of the respective oscillation circuit for exciting the vibratable unit, and can easily be adapted to different sensors, in particular different vibratable units.

Quadrature demodulation is a modulation method known per se from the prior art, in which amplitude modulation and phase modulation are combined. Both analog and digital methods based on quadrature modulation have become known. In combination with a vibronic sensor with an electronic unit with an adaptive filter, as is the case for the present invention, this solution offers the great advantage of enabling highly accurate detection of the phase offset, which is also independent of the respective signal amplitude. In many cases of variants used in connection with vibronic sensors with respect to phase detection, in particular those using the principle of a lock-in, for example, rectangular signals are used in order to be independent of the signal amplitude in each case. However, this has the disadvantageous effect that undesirable additional phase offsets can occur between the excitation signal and the reception signal, which have a negative effect on the measurement accuracy.

In one embodiment of the vibronic sensor, the detection unit comprises a first and/or a second reference unit for generating a first and/or a second reference signal for performing the quadrature demodulation. With regard to the first and/or second reference unit, it is advantageous if these are designed to generate the first and/or second reference signal on the basis of the reception signal.

With respect to the reference unit(s), it is further advantageous if one of the two reference units comprises a first phase shifter for generating one of the reference signals with a phase offset of +/−90° with respect to the reception signal. Advantageously, the first phase shifter is in particular a second adaptive filter, which is in particular identical in design to the first adaptive filter, an all-pass filter or a Hilbert transform.

It is equally advantageous if the other of the two reference units comprises a second phase shifter for generating one of the reference signals with a phase offset of 0° with respect to the reception signal. The second phase shifter is advantageously a multiplier or an adaptive filter, in particular a resonator filter.

In one embodiment of the vibronic sensor, the electronic unit is designed to set the target phase offset by setting the center frequency of the adaptive filter, in particular by means of a phase control unit. The center frequency is thus varied such that there is a specific, specifiable phase offset between the excitation signal and the reception signal. In this connection, reference is made to DE102014119061A1.

In a further embodiment of the vibronic sensor, the target phase offset is 90°, 45°, or 0°. While a specifiable phase offset of 90° or 0°, as a function of the embodiment of the sensor unit, in particular the drive/receiving unit, leads to resonant excitation of the vibratable unit, a specifiable phase offset of +/−45° may be preferable for determining density or viscosity.

A wide variety of filters can be used as adaptive filters. Preferably, the first and/or second adaptive filter is a resonator filter or a bandpass filter, in particular a low-pass filter, in particular a 2nd order low-pass filter.

Still another embodiment of the vibronic sensor according to the invention includes that the electronic unit is designed to alternately execute a first and a second operating mode, wherein the drive/receiving unit is designed to excite mechanical vibrations in the mechanically vibratable unit by means of an electrical excitation signal during the first operating mode, wherein the electronic unit is designed, during the second operating mode, to interrupt the excitation of the mechanically vibratable unit by means of the excitation signal,
to receive the mechanical vibrations of the mechanically vibratable unit and convert same into an electrical reception signal,
to set at least one value of a filter characteristic of the adaptive filter such that there is a specifiable phase offset between the excitation signal and the reception signal, and
to determine the at least one process variable from the reception signal.

In this connection, reference is made to DE102016111134A1.

During the first operating mode, hereinafter also referred to as the excitation sequence, mechanical vibrations are excited in the mechanically vibratable unit by means of the drive/receiving unit. During the second operating mode, also referred to as the measurement/control sequence, the excitation of the vibratable unit is interrupted. Thus, the electrical excitation signal is not applied to the excitation/receiving unit during the second operating mode. During the second operating mode, the vibratable unit continues to vibrate at its natural frequency in the form of a damped vibration. The vibrations are converted into an electrical reception signal, from which in turn the at least one process variable is determined and the current phase offset between the excitation signal and the reception signal is controlled by suitable setting, at least of the filter characteristic, to a specifiable value or a specifiable phase offset. The excitation signal is thus generated on the basis of the reception signal. A decisive advantage in this connection is that the detection of the mechanical vibrations in the form of the reception signal and its evaluation can take place independently of the excitation signal. This is particularly advantageous if, for example due to the design, couplings can occur between the excitation signal and the reception signal. This is the case, for example, if a superimposition of the excitation signal and the reception signal takes place.

The process variable is, for example, a fill level, in particular a specifiable one, the density or the viscosity of the medium in the container. The vibratable unit of the vibronic sensor can be designed, for example, in the form of a diaphragm, a single rod or a vibrating fork. The drive/receiving unit, in turn, can be in particular an electromagnetic or a piezoelectric drive/receiving unit.

The object on which the invention is based is further achieved by a method for operating a vibronic sensor for determining and/or monitoring at least one process variable of a medium in a container, in particular according to one of the described embodiments, wherein mechanical vibrations are excited in a mechanically vibratable unit by means of an electrical excitation signal, and the mechanical vibrations of the mechanically vibratable unit are received and converted into an electrical reception signal, wherein the excitation signal is generated on the basis of the reception signal, and the at least one process variable is determined, and wherein the filter characteristic of an adaptive filter is set such that there is a target phase offset between the excitation signal and the reception signal. According to the invention, a phase offset between the excitation signal and the reception signal and/or an amplitude of the reception signal is determined using a quadrature demodulation.

The excitation signal can be a periodic signal, for example a triangular signal, a sinusoidal signal or a square wave signal. Preferably, the vibratable unit performs resonant vibrations in the fundamental mode when in the adjusted state.

The method according to the invention can also be used for digital as well as for analog versions of the respective oscillation circuit for exciting the vibratable unit. Likewise, by using the method according to the invention, different phase setting accuracies can be realized depending on the application, and different specifiable phase offsets can be set depending on the application.

The embodiments described in connection with the vibronic sensor according to the invention can also be applied mutatis mutandis to the method according to the invention and vice versa.

BRIEF DESCRIPTION OF THE DRAWINGS

The invention and its advantageous embodiments are described in more detail below with reference to the figures, FIG. 1-FIG. 3. The following is shown.

DETAILED DESCRIPTION

Figure 1:
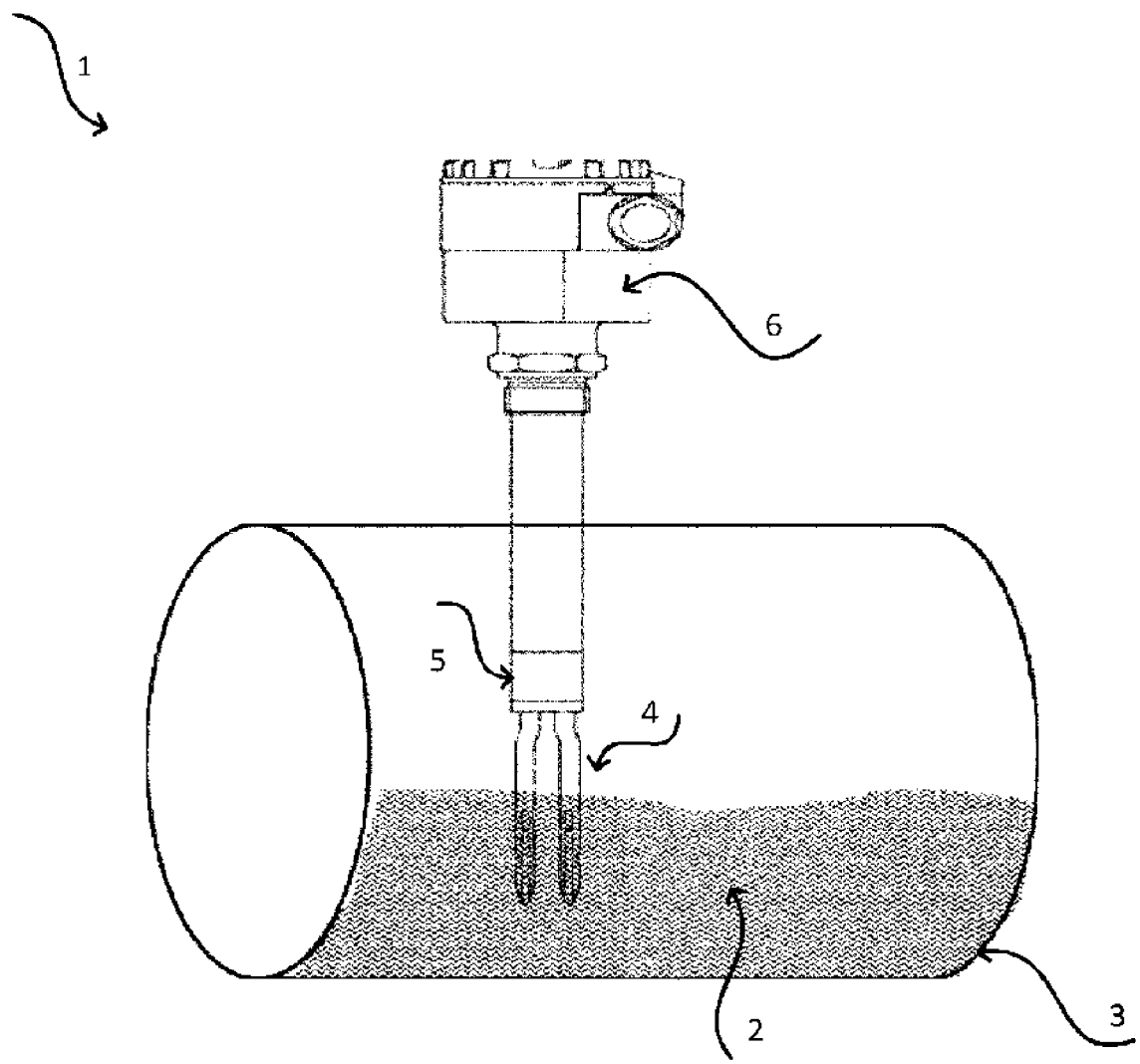
FIG. 1 shows a schematic drawing of a vibronic sensor according to the prior art.

FIG. 1 shows a vibronic sensor 1. A vibratable unit 4 is depicted in the form of a vibrating fork which is partially immersed in a medium 2, which is located in a container 3. Mechanical vibrations are excited in the vibratable unit by the excitation/receiving unit 5, and the vibratable unit can, for example, be a piezoelectric stack drive or bimorph drive. However, it is naturally understood that other embodiments of a vibronic sensor also fall under the invention. Furthermore, an electronic unit 6 by means of which the signal detection, signal evaluation and/or signal supply takes place is shown.

Figure 2:
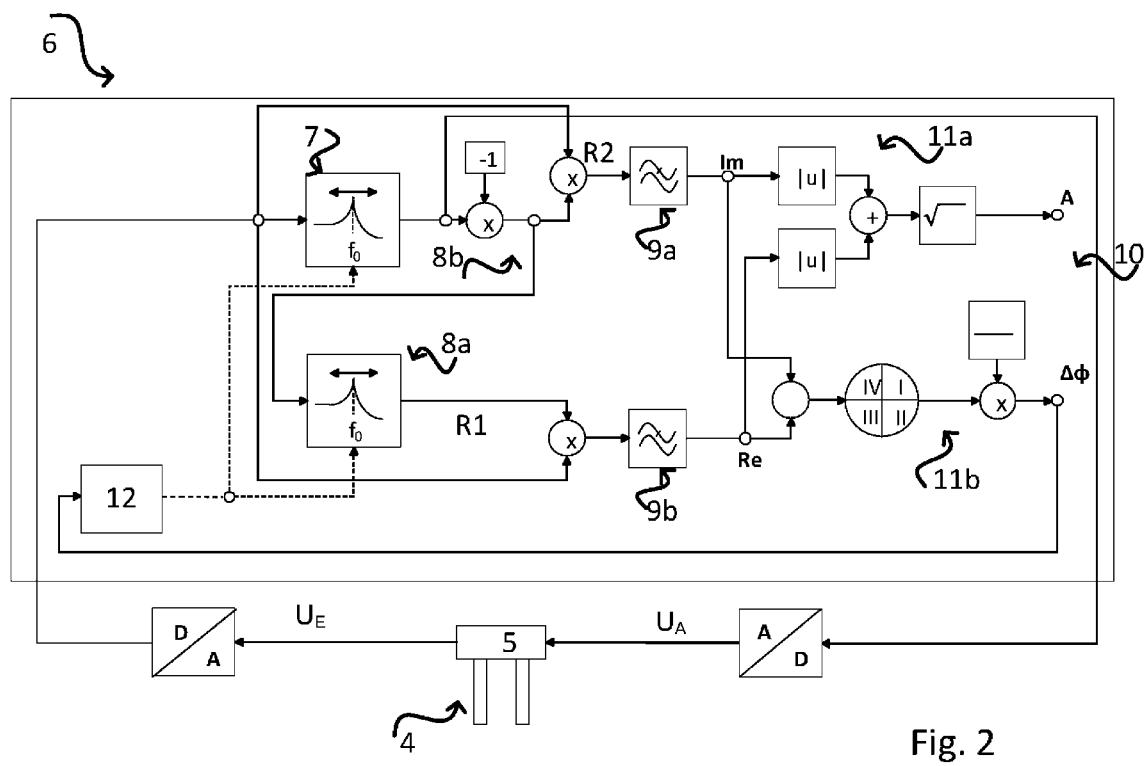
FIG. 2 shows a block diagram of a first embodiment of an electronic unit according to the present disclosure.

A block diagram of a first exemplary embodiment for an electronic unit according to the invention is the subject matter of FIG. 2.

Mechanical vibrations are excited in the vibratable unit 4 by means of the excitation signal $U_A$. The reception signal $U_E$ representing these vibrations first passes through an analog/digital converter D/A before it is supplied to the first adaptive filter 7. In continuous operation, the filter characteristic of the adaptive filter 7 is set so that there is a specifiable phase offset $\phi_{soll}=360°-\phi_{Filter}$ between the excitation signal $U_A$ and the reception signal $U_E$, wherein $\phi_{filter}$ is the phase offset between the input signal and the output signal of the adaptive filter 7. A control then controls the phase appropriately on the basis of the phase offset $\Delta\phi$ detected in each case. For further details on a setting of the target phase offset $\phi_{soll}$ by means of an adaptive filter 7, refer to DE102014119061A1.

By means of the detection unit 10, the amplitude 11a of the reception signal $U_E$ and the phase offset 11b $\Delta\phi$ between the excitation signal $U_A$ and the reception signal are determined. According to the invention, the detection unit 10 is designed to determine the phase offset $\Delta\phi$ using a quadrature demodulation. In this manner, a high degree of accuracy can be achieved with regard to the determination, which determination is also advantageously independent of the respective signal amplitudes. Before entering the detection unit 10, the respective input signals here each pass through a low-pass filter 9a, 9b, which is optional in itself.

Detection of the phase $\Delta\phi$ by means of the quadrature demodulation requires two reference signals R1, R2, which are advantageously generated from the reception signal $U_E$ in the embodiment shown here. Advantageously, no further signal sources are required to generate the reference signals R1, R2. The reference signals R1, R2 can be generated in a particularly simple manner. A first reference unit 8a is used to generate a first reference signal R1 with a phase offset of +90° with respect to the reception signal $U_E$ and, for this purpose, comprises here by way of example a second adaptive filter, which is of identical design to the first adaptive filter 7. Alternatively, other elements that are not identical in design to the first adaptive filter 7 can be used; for example, an adaptive bandpass filter can also be used. The first reference unit 8a can also comprise multiple components to generate a phase offset of +/−90°.

A second reference unit 8b is used to generate a second reference signal R2 with a phase offset of 0° with respect to the reception signal $U_E$ and, here, comprises a multiplier for this purpose. Moreover, it should be noted that there are numerous other alternatives available that are familiar to those skilled in the art.

Figure 3:
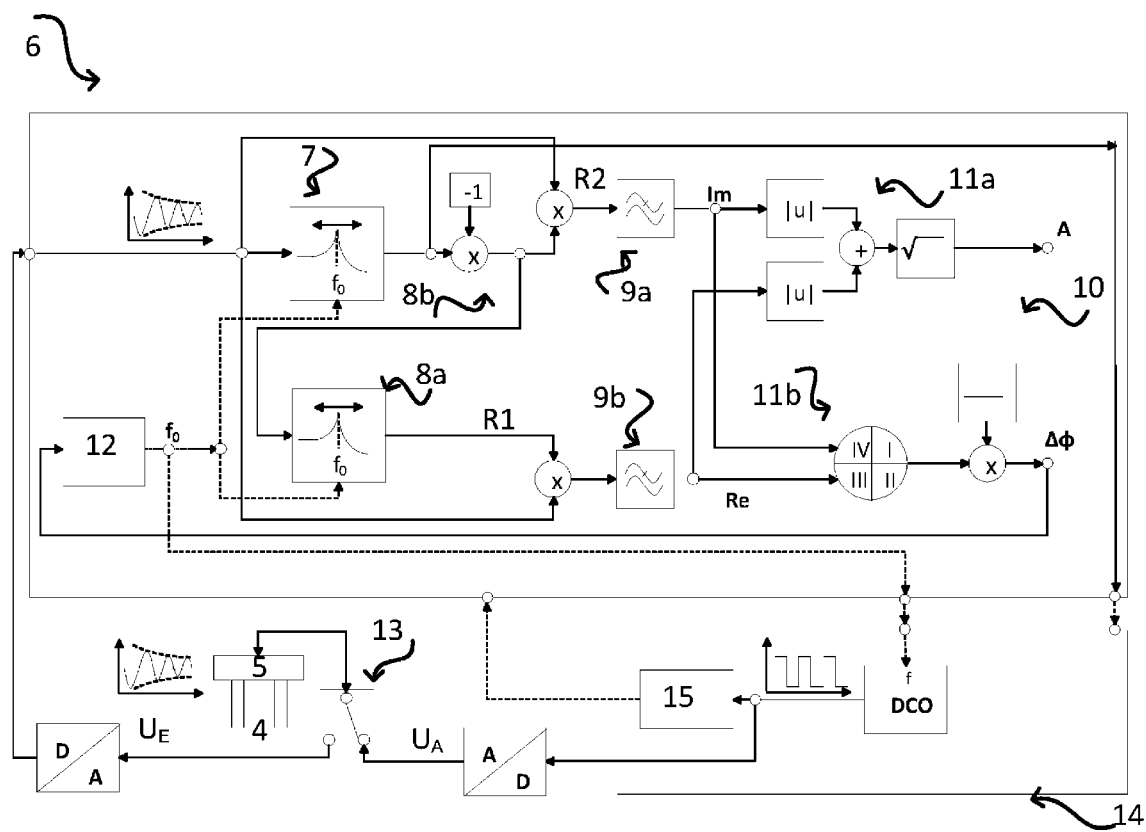
FIG. 3 shows a block diagram of a further embodiment of an electronic unit according to the present disclosure for illustrating the performance of two operating modes.

A further exemplary embodiment of an electronic unit 6 according to the invention is the subject matter of FIG. 3. For this embodiment, two different operating modes are performed, and the electronic unit 6 comprises a switching element 13 for switching back and forth between the two operating modes.

With regard to the performance of two operating modes, reference is made to DE102016111134A1. In the first operating mode, also referred to as the excitation sequence, an excitation signal $U_A$ is applied to the vibratable unit 4, and mechanical vibrations are induced. The vibratable unit 4 thus stores vibration energy in this manner. The reception signal $U_E$ coming from the vibratable unit 4 is superimposed on the excitation signal $U_A$. During the excitation sequence, no active measurement or setting is made with respect to the currently present phase offset $\Delta\phi$ between the excitation signal $U_A$ and the reception signal $U_E$. The filter characteristic of the adaptive filter 7 remains constant.

During the second operating mode 16, also referred to as the measurement/control sequence, the application of the excitation signal $U_A$ to the sensor unit 4, 5 is interrupted by means of the switching element 13. The vibratable unit 4 now vibrates at its natural resonant frequency $f_0$ and performs a damped resonant vibration accordingly. The excitation signal $U_A$ is now no longer superimposed on the reception signal $U_E$, so that a suitable signal evaluation can be carried out in an evaluation unit 14 of the electronic unit 6 designed for this purpose, which here by way of example has a digitally controlled oscillator DCO and a unit for detecting a zero crossing 15. The control of the current phase offset $\Delta\phi$ between excitation signal $U_A$ and reception signal $U_E$ is continued. For example, to control the current phase offset $\Delta\phi$, the center frequency $f_m$ of the adaptive filter 7 can be suitably set. Thus, during the successive measurement/control sequences, various internal parameters and/or values of the parameters used for control and phase measurement are successively changed until, for example, resonant excitation of the sensor unit 4, 5 occurs.

The invention claimed is:

1. A vibronic sensor for determining and/or monitoring at least one process variable of a medium in a container comprises:
   a mechanically vibratable unit;
   a drive/receiving unit;
   an electronic unit including a first adaptive filter; and a detection unit, wherein the drive/receiving unit is designed to excite mechanical vibrations in the mechanically vibratable unit via an electrical excitation signal and is further designed to receive mechanical vibrations of the mechanically vibratable unit and convert the received mechanical vibrations into an electrical reception signal, wherein the electronic unit is designed to generate the electrical excitation signal on the basis of the electrical reception signal and to determine the at least one process variable from the electrical reception signal, wherein the electronic unit is designed to set a filter characteristic of the first adaptive filter to produce a target phase offset between the electrical excitation signal and the electrical reception signal, wherein the detection unit is designed to determine a phase offset between the electrical excitation signal and the electrical reception signal and an amplitude of the reception signal using a quadrature demodulation, wherein the detection unit includes a first and/or a second reference unit for generating a first and/or a second reference signal for performing the quadrature demodulation, wherein the first and/or second reference unit is/are designed to generate the first and/or second reference signal on the basis of the electrical reception signal, wherein one of the two reference units includes a first phase shifter for generating one of the reference signals with a phase offset of +/−90° with respect to the electrical reception signal, and wherein the first phase shifter is a second adaptive filter of identical design to the first adaptive filter, an all-pass filter, or a Hilbert transform.

2. The vibronic sensor according to claim 1, wherein one of the two reference units includes a second phase shifter for generating one of the reference signals with a phase offset of 0° with respect to the electrical reception signal.

3. The vibronic sensor according to claim 2, wherein the second phase shifter is a multiplier, an adaptive filter, or a resonator filter.

4. The vibronic sensor according to claim 1, wherein the electronic unit is designed to set the target phase offset by setting a center frequency of the first adaptive filter via a phase control unit.

5. The vibronic sensor according to claim 1, wherein the target phase offset is 90°, 45°, or 0°.

6. The vibronic sensor according to claim 1, wherein the first adaptive filter and/or the second adaptive filter is a resonator filter, a bandpass filter, a low-pass filter, or a 2nd order low-pass filter.

7. The vibronic sensor according to claim 1, wherein the electronic unit is designed to alternately execute a first and a second operating mode, wherein the drive/receiving unit is designed to excite mechanical vibrations in the mechanically vibratable unit via the electrical excitation signal during the first operating mode, wherein the electronic unit is designed, during the second operating mode, to interrupt the excitation of the mechanically vibratable unit by the excitation signal, to receive the mechanical vibrations of the mechanically vibratable unit and convert the received mechanical vibrations into the electrical reception signal, to set a value of the filter characteristic of the first adaptive filter such that there is a specifiable phase offset between the excitation signal and the reception signal, and to determine the at least one process variable from the electrical reception signal.

\* \* \* \* \*